PATENTED OCT 22 1974

3,843,775

INVENTOR
ROBERT L. WOLF

Brumbaugh, Graves,
Donohue & Raymond
ATTORNEY

United States Patent [19]
Wolf

[11] 3,843,775
[45] Oct. 22, 1974

[54] RADIOIMMUNOASSAY OF ANGIOTENSIN AND RENIN ACTIVITY

[75] Inventor: Robert L. Wolf, New York, N.Y.

[73] Assignee: Mount Sinai Research Foundation, Inc., New York, N.Y.

[22] Filed: July 12, 1971

[21] Appl. No.: 161,697

Related U.S. Application Data

[63] Continuation-in-part of Ser. No. 699,098, Jan. 19, 1968, Pat. No. 3,592,888.

[52] U.S. Cl. .................... 424/1, 23/230 B, 250/303
[51] Int. Cl. ...................... A61k 27/04, G01n 23/00
[58] Field of Search ................ 424/1, 12; 23/230 B; 252/301.1 R; 250/302, 303

[56] References Cited
UNITED STATES PATENTS
3,442,819  2/1966  Herbert .............................. 252/428
3,555,143  1/1971  Axen et al. ............................ 424/1

OTHER PUBLICATIONS
Haber et al., "Biochemistry," Vol. 4, No. 4, pp. 693–698, (April, 1965).
Haber et al., "Analytical Biochemistry," Vol. 12, No. 1, (July, 1965) pp. 163–172.

*Primary Examiner*—Benjamin R. Padgett
*Attorney, Agent, or Firm*—Brumbaugh, Graves, Donohue & Raymond

[57] ABSTRACT

A process for assaying the quantity of angiotensin and renin employing radioimmunoassay techniques, comprising the steps of combining solutions of (1) antibody to angiotensin coupled to poly-L-lysine, (2) angiotensin labeled with radioactivity, and (3) varying known amounts of unlabeled angiotensin to produce mixtures having a pH of about 7.0 to 9.5, which upon incubation form angiotensin-antibody complexes. The mixtures of angiotensin-antibody complexes (antibody-bound angiotensin) and free angiotensin are applied either to paper strips, coated charcoal, ion exchange resins or resin sponges, and subjected to radioimmunoassay techniques to separate the antibody-bound angiotensin complexes from the free angiotensin. Some of the free and antibody-bound angiotensin is radioactive; and the ratio of radioactivity of the antibody-bound angiotensin complex to free angiotensin is measured and plotted as a function of the known concentrations of angiotensin in each mixture to prepare a standard concentration graph. The process is repeated employing solutions of a material to be assayed containing unknown amounts of unlabeled angiotensin, which may be derived from the action of renin on renin substrate, and the concentration of angiotensin is read from the graph.

6 Claims, 2 Drawing Figures

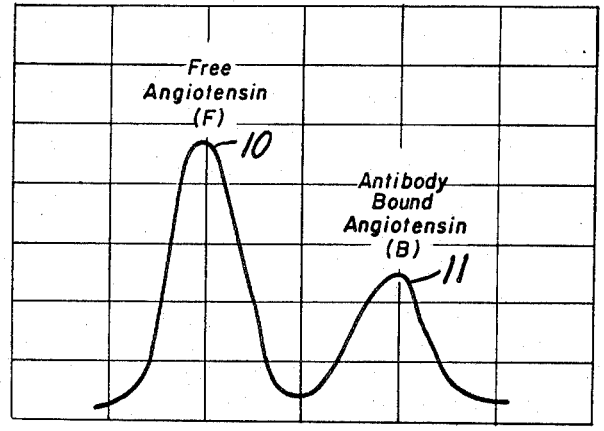

3,843,775

RADIOIMMUNOASSAY OF ANGIOTENSIN AND RENIN ACTIVITY

CROSS REFERENCE TO RELATED APPLICATION

This is a continuation-in-part of application Ser. No. 699,098, Now Pat. No. 3,592,888 filed Jan. 19, 1968, for "Radioimmunoassay of Angiotensin and Renin Activity."

BACKGROUND OF THE INVENTION

The present invention relates to a process for detecting and measuring quantities of angiotensin and renin and, more particularly, to a process for employing the techniques of radioimmunoassay to assay quantities of angiotensin and renin.

Angiotensin II is a physiologically active octapeptide hormone which increases the blood pressure when present in the body. Renin substrate is the precursor of angiotensin and is converted to antiotensin by the enzyme renin which is produced in the kidney. Although angiotensin alone is unable to elicit the production of a specific antibody, it is known that angiotensin can promote the production of a specific antibody in animals, when the angiotensin is coupled with a carrier molecule, poly-L-lysine, at the carboxyl-terminal phenylalanine or amino-terminal asparagine ends of angiotensin. The antibody combines with angiotensin to form an angiotensin-antibody complex.

Researchers in the field have also found that the angiotensin may be identified as it complexes with the antibody by labeling the angiotensin with a radioactive isotope, such as iodine 131 or 125. The angiotensin-$I^{131}$-antibody complex forms when the two are mixed. The angiotensin-antibody complexes with equal affinity with either unlabeled or labeled angiotensin, and therefore, as unlabeled angiotensin is added to the labeled angiotensin-antibody mixture, the amount of free angiotensin-$I^{131}$ increases.

SUMMARY OF THE INVENTION

It is therefore an object of this invention to provide a process for separating the radioactive angiotensin-antibody complexes (bound angiotensin) from free radioactive angiotensin. It is furthermore an object of this invention to provide a method for rapidly determining the concentrations or quantities of unknown amounts of angiotensin and renin.

In accordance with the invention, the objects are achieved by the following process. Mixtures are formed containing three components: (1) the antibody of angiotensin, which has been made antigenic by coupling the angiotensin to the carrier molecule poly-L-lysine by means of its carboxyl-terminal phenylalanine (A-(Phe)-PL) or aminoterminal asparagine (PL(Asn)-A), (2) radioactively labeled angiotensin (iodine 131, iodine 125, etc.), and (3) varying known amounts of unlabeled angiotensin. The mixtures should be in the range of approximately pH 7.0 to 9.5, and are allowed to incubate to form angiotensin-antibody complexes and thus increase the quantity of free angiotensin-$I^{131}$ present in the mixtures. The mixtures are then subjected to one of the following three radioimmunoassay techniques to separate the antibody-bound angiotensin complex from the free angiotensin: (1) paper radioelectrophoresis, (2) coated charcoal, or (3) ion exchange resins or resin-sponges. After separation is effected, a standard curve is established by plotting the ratios of the radioactivities of the bound to free angiotensin versus the known concentrations of angiotensin. The concentration of angiotensin or renin in a material to be assayed may thereafter be derived by replacing the known quantities of angiotensin with solutions of the material, repeating the radioimmunoassay and radioactivity measuring techniques, and entering the standard curve with the ratio thus ascertained.

DETAILED DESCRIPTION OF INVENTION

Figure 1:
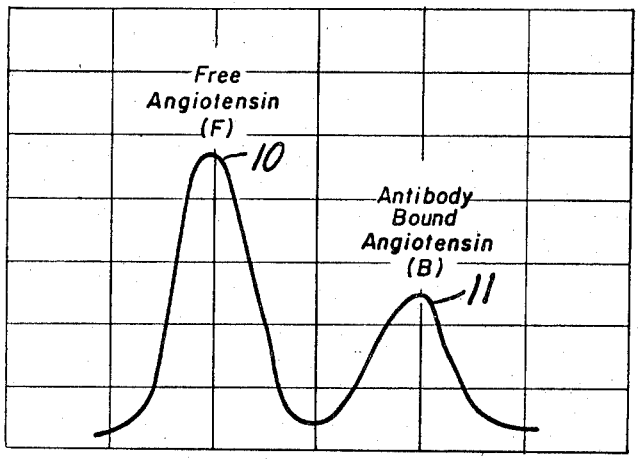
FIG. 1 is a radioelectrophoretogram showing the relationship of the radioactivities of free angiotensin-$I^{131}$ and antibody-bound angiotensin.

Following the separation of the antibody-bound angiotensin complex from the free angiotensin, the radioactivities in the complex and in the free angiotensin group are counted to prepare a radioelectrophoretogram as shown in FIG. 1, wherein the radioactivities of the antibody-bound angiotensin complex 10 and the free angiotensin-$I^{131}$ 11 are located in separate peaks permitting visual comparison and computation of the relative areas under each peak.

Figure 2:
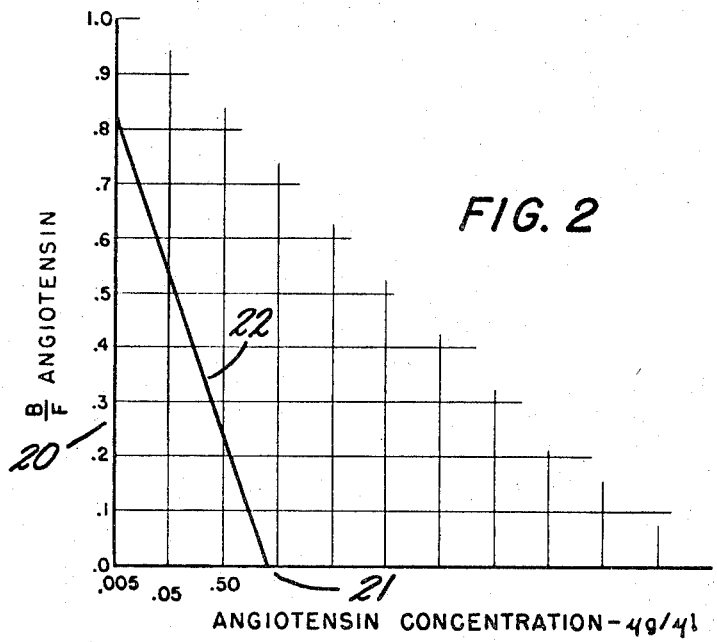
FIG. 2 represents a graph illustrating the relationship between the ratio of radioactive angiotensin-antibody complexes to free angiotensin-$I^{131}$ and the concentration of angiotensin.

A standard line graph as shown in FIG. 2 is prepared by plotting the ratios 20 of the radioactivity of the antibody-bound angiotensin complex to the radioactivity of the free angiotensin-$I^{131}$ as functions 22 of the varying known amounts of unlabeled angiotensin 21 contained in each mixture. Since the amount of labeled angiotensin present in each mixture is infinitesimal in comparison with the amount of unlabeled angiotension added, it is simpler in practice to use the total of the amounts of labeled and unlabeled angiotensin present in the mixture to plot the line graph.

The concentration of unknown amounts of angiotensin in solution is determined by substituting the unknown angiotensin solution for the known amounts of unlabeled angiotensin in the mixture described above. The process is then repeated to determine the ratio of the radioactive antibody-bound angiotensin complex to free angiotensin-$I^{131}$. The ratio is located on the line graph, from which the concentration of the unknown solution of angiotensin may be immediately established.

In formulating the mixtures of angiotensin antibody, angiotensin-$I^{131}$, and unlabeled angiotensin, it has been found advantageous to prepare the mixtures in a solution of buffer containing approximately 0.25 to 0.5 percent human serum albumin, and to maintain the pH between 7.0 and 9.5, and preferably about 8.6. A suitable solution, for example, is barbitone buffer with human serum albumin, calcium chloride and neomycin sulfate (concentration 0.05M; pH 8.6). Alternatively, a triacetate buffer with lysozyme (concentration 0.1M; pH 7.4) may be used. In order to establish efficiently the known quantities of angiotensin in the standard mixtures and to ensure the purity of the angiotensin samples, it is preferred to use synthetic angiotensin.

Although antibodies from any standard research animal may be used, such as dog, hamster, or guinea pig, excellent results have been obtained using rabbit antibody.

In applying the technique of paper radioelectrophoresis, it has been found that the following conditions provide excellent results. A great saving of time and effort may be achieved if several mixtures are processed simultaneously. Mixtures containing varying known amounts of synthetic angiotensin may be processed at the same time that mixtures containing unknown amounts of anagiotensin are being processed.

The mixtures are refrigerated at approximately 4°C for approximately 24 hours. During this period of time, both the labeled and unlabeled angiotensin combine with the antibody to form angiotensin-antibody complexes. Portions of the mixture are applied to the cathode ends of strips of Whatman No. 3 MM filter paper. The filter paper is placed on horizontal supports with the two ends immersed in buffer solutions, and a potential of approximately 200 volts is applied across the paper for 10 to 25 hours. The buffer solution employed has a pH of approximately 8.6 with an ionic strength of approximately 0.1. Satisfactory separation of the angiotensin-antibody complex from free angiotensin is accomplished under these conditions.

If desired, a quantity of nonimmune (control) rabbit plasma or serum may be added to each mixture tube to prevent adsorption to the paper or glass of antigen-antibody complexes which are present in low concentrations. The paper strips are then dried and assayed for radioactivity in an automatic strip scanner employing a linear ratemeter with an integrating count circuit. The protein in the strips may be stained with naphthalene black and 10 percent acetic acid in methyl alcohol.

It has been observed that the angiotensin-antibody complex migrates with the mobility of gamma globulin in the anodal direction. The free angiotensin, however, migrates more rapidly in the anodal direction, which results in the desired separation of the two groups.

The ratio of bound radioactive angiotensin is plotted on a graph as a function of the varying known concentrations of unlabeled angiotensin contained in the mixtures. It is preferred to dilute the mixture appropriately to yield an initial bound to free ratio of between 1.5 and 3.0 in the absence of added unlabeled angiotensin. It is also desirable to select an antiserum (rabbit antibody to angiotensin coupled to poly-L-lysine) which will result in a sharp slope of decline of the ratio of bound to free radioactive angiotensin with increasing angiotensin concentration. The resulting graph may be used to find the concentration of unlabeled angiotensin in 0.001 m g) quantities.

The mixtures containing unknown amounts of unlabeled angiotensin are subjected to the same paper radioelectrophoresis technique as discussed above. The ratio of bound radioactive angiotensin to free radioactive angiotensin is then located on the standard line graph prepared as described above. From the graph the concentration of the unknown amounts of angiotensin may immediately be determined.

As an alternative method of separating the radioactive antibody-bound angiotensin complexes from the free angiotensin-$I^{131}$, a procedure may be employed utilizing coated charcoal. According to this procedure, portions of the mixtures containing the known and unknown angiotensin specimens are mixed with suspensions of charcoal powder coated with dextran. The charcoal is precipitated by centrifugation and contains the free angiotensin. The supernatant fluid contains the radioactive antibody-bound angiotensin complexes, and the radioactivity is counted in a well-type scintillation counter.

A standard curve, i.e., line graph, is then constructed, as before, by plotting the ratio of the corrected counts per minute (cpm) of the supernatant fluid (antibody-bound angiotensin) to the counts per minute (cpm) of the charcoal residue (free angiotensin) as a function of the concentration (m$\mu$g/ml) of angiotensin, after calculation of the corrected bound fraction from control tubes. The amount of angiotensin in the unknown specimens may be readily determined from the standard line graph.

Another method of separating the antibody-bound angiotensin complexes from the free angiotensin-$I^{131}$ employs the use of ion exchange resins or resin-sponges. According to this technique, portions of the mixtures containing the standard and unknown angiotensin specimens are applied to ion exchange resins or resin-sponges. The effluent or supernatant fluid retains the antibody-bound angiotensin complexes while the free angiotensin-$I^{131}$ is adsorbed onto the ion exchange resin or resin-sponge. The supernatant fluid and the resins are then processed to count the radioactivity in a manner similar to the techniques outlined above for coated charcoal. A standard graph is prepared for use in determining the concentration of angiotensin contained in the unknown angiotensin specimens.

The process of the invention may also be used to determine the activity of renin. In order to assay the activity of renin, the fluid containing the renin is immediately cooled to about 0° to 5°C. An anticoagulant may be added, such as the ammonium salt of ethylenediaminetetraacetic acid. The renin-containing fluid (plasma) is incubated at a pH of about 5.5 and at a temperature of about 37°C with an ammonium type resin (such as Dowex resin 50 w-x2). The resulting angiotensin, which is liberated during incubation, is adsorbed onto the resin and protected from inactivation by the angiotensinases. The adsorbed angiotensin is then eluted from the resin and assayed as described above according to one of the three radioimmunoassay techniques.

According to another method of ascertaining renin activity, duplicate quantities of the solutions of material to be assayed are prepared. One quantity or set of quantities is assayed by any one of the three techniques described to determine its angiotensin concentration. The other quantity or set of quantities is incubated for a time prior to the addition thereto of the labeled angiotensin or antibody. Preferably, such incubation is carried out at approximately 37°C for about 3 hours. The labeled angiotensin and antibody may then be mixed with the solution and the concentration of angiotensin determined by the same radioimmunoassay technique used with the first of the duplicate solutions. Knowledge of the renin activity of the material may then be obtained by calculating the release of angiotensin by the material during the 3 hour incubation period, e.g., in m$\mu$g/ml/hr.

The following examples are intended to be illustrative of the process of the invention, and are not to be considered as defining the scope of the invention.

EXAMPLE I

Two standard mixtures of (1) rabbit antiserum to angiotensin, (2) labeled synthetic angiotensin-$I^{131}$, and (3) unlabeled synthetic angiotensin were prepared having angiotensin concentrations of 0.005 μg/30 μl and 0.05 μg/30 μl. A third mixture of (1) antiserum (antibody), (2) labeled synthetic angiotensin, and (3) unlabeled angiotensin in an unknown concentration was also prepared. The three mixtures were prepared in buffer solutions at pH 8.6 containing 0.25 percent human serum albumin and incubated at 4°C for 24 hours. 50 μl of nonimmune (control) rabbit plasma were added to each mixture to prevent adsorption onto the paper during radioelectrophoresis. Portions of the three mixtures were applied to strips of Whatman No. 3MM filter paper, and the ends of the strips were placed in barbital buffer solutions at pH 8.6 and an ionic strength of 0.1. Radioelectrophoresis was effected at a constant temperature of 4°C for 18 hours with a 200 volt potential. The strips were assayed for radioactivity after drying, employing an automatic strip scanner connected to a linear ratemeter with an integrating count circuit and a dual channel recorder. The areas under the two peaks of the paper radioelectrophoretogram representing the radioactivity of the free angiotensin-$I^{131}$ and the radioactivity of the labeled angiotensin-antibody complex were determined, and the ratios of bound to free angiotension-$I^{131}$ were ascertained. The ratios were 0.83 and 0.53 for the known solutions and 0.24 for the unknown solution. The first two ratios were plotted on graph paper as functions of the known concentrations of unlabeled angiotensin to produce two points. The points were connected with a straight line to form a line graph. The ratio of the unknown solution was located on the line graph and the concentration of the unknown solution of angiotensin was found to be 0.5 μg/30 μl.

EXAMPLE II

To plastic tubes containing a triacetate buffer with lysozyme (concentration 0.1M; pH 7.4) quantities of the material to be assayed, i.e., specimens of unknown angiotensin concentration, were added. Synthetic angiotensin labeled with iodine 131 in an amount of approximately 5,000 cpm/50 μl and angiotensin antibody (antiserum) were then added. Other tubes, similarly containing the buffer solution, were charged with labeled angiotensin, of like concentration as before, and quantities of angiotensin ranging from between 0.01 mμg/ml and 1.0 mμg/ml. The mixtures in all tubes were incubated at 4°C for about 24 hours.

A suspension of charcoal powder coated with dextran was prepared by dissolving 0.25 gm of dextran in 100 ml of barbital buffer (pH 7.4) and adding 2.5 gm of powdered pharmaceutical grade charcoal. The suspension was diluted 1 to 4 with additional barbital buffer and rapidly mixed with the contents of each tube. Thereafter, the reaction mixtures were centrifuged for 30 minutes at 4°C and 5,000 rpm.

The supernatant fluid was decanted from the tubes, and the fluid and charcoal residue of each tube counted separately in a well-type scintillation counter. A standard curve was then constructed by plotting the ratio of the cpm of supernatant (antibody-bound angiotensin) to the cpm of the residue (free angiotensin) for each mixture of known angiotensin concentration as a function of that concentration, and fitting the best curve possible to the points thus plotted to establish a line graph. Representative ratios of known solutions derived in this manner were 0.4 and 0.2 for unlabeled angiotensin concentrations of 100 pg/ml (0.1 mμg/ml) and 500 pg (0.5 mμg/ml), respectively. The ratio of an unknown specimen was 0.3 which was found from the standard curve to correspond to an angiotensin concentration of 250 pg (0.25 mμg/ml).

The process described herein may thus be used to assay the activity of angiotensin and of renin in an efficient and rapid manner. The concentration of a sample of angiotensin is readily determined with the use of the standard graphs, thereby providing the solution to a problem long recognized in the art.

I claim:

1. A process for assaying angiotensin activity in a material comprising the steps of:
   1. preparing mixtures of (i) antibody to angiotensin coupled to poly-L-lysine, (ii) angiotensin labeled with a radioactive isotope, and (iii) varying known amounts of unlabeled angiotensin,
   2. incubating the mixtures to form antibody-bound radioactive angiotensin complexes and antibody-bound unlabeled angiotensin complexes and increase the quantity of radioactive free angiotensin present in the mixtures,
   3. mixing the mixtures with a suspension of charcoal powder coated with dextran to cause the free angiotensin to react with the charcoal powder,
   4. precipitating the charcoal powder from the suspension to separate the free angiotensin from the antibody-bound angiotensin complexes,
   5. counting the radioactivity of the supernatant fluid and of the charcoal powder residue to determine the ratios of the radioactivity of antibody-bound angiotensin to the radioactivity of free angiotensin,
   6. referencing the ratios of bound to free radioactive angiotensin to the known amounts of angiotensin in said mixtures to establish a relationship between the ratio of bound to free angiotensin and the concentration of angiotensin,
   7. repeating steps (1) to (5) using a solution of the material to be assayed containing an unknown amount of unlabeled angiotensin in place of the known amounts of unlabeled angiotensin to determine the ratio of radioactive bound angiotensin to radioactive free angiotensin for the material, and
   8. comparing the ratio determined according to step (7) with the relationship previously established according to step (6) to determine the concentration of angiotensin in the material being assayed.

2. A process according to claim 1, wherein the mixtures of (i) antibody, (ii) labeled angiotensin, and (iii) unlabeled angiotensin are prepared in a buffer solution and have a pH within the range of from about 7.0 to 9.5.

3. A process according to claim 1, wherein the mixtures of (i) antibody, (ii) labeled angiotensin, and (iii) unlabeled angiotensin are incubated at approximately 4°C for about 24 hours.

4. A process according to claim 1, wherein mixtures of (i) antibody and (ii) labeled angiotensin are prepared and diluted to yield an initial bound to free angiotensin radioactivity ratio of from approximately 1.5 to 3.0 prior to being added to the unlabeled angiotensin.

5. A process according to claim 1, wherein the charcoal powder is precipitated by centrifugation.

6. A process according to claim 1 further comprising the steps of:

incubating a duplicate quantity of the solution of material to be assayed for approximately 3 hours at about 37°C prior to adding thereto the labeled angiotensin and angiotensin antibody, ascertaining the concentration of angiotensin in the duplicate solution by repeating steps (1) to (5) using the incubated duplicate solution in place of the known amounts of unlabeled angiotensin to determine the ratio of radioactive bound angiotensin to radioactive free angiotensin for the duplicate solution, and locating the ratio thus determined on the line graph plotted according to step (6), whereby an indication of renin activity in the material may be obtained from the rate of release of angiotensin by the material.

\* \* \* \* \*